United States Patent [19]

Smith

[11] Patent Number: 5,754,632
[45] Date of Patent: May 19, 1998

[54] MANAGEMENT OF COMMUNICATIONS NETWORKS

[75] Inventor: Dean John Smith, Northampton, United Kingdom

[73] Assignee: British Telecommunications Public Limited Company, London, United Kingdom

[21] Appl. No.: 530,171

[22] PCT Filed: Mar. 23, 1994

[86] PCT No.: PCT/GB94/00599

§ 371 Date: Nov. 28, 1995

§ 102(e) Date: Nov. 28, 1995

[87] PCT Pub. No.: WO94/23528

PCT Pub. Date: Oct. 13, 1994

[30] Foreign Application Priority Data

Mar. 31, 1993 [EP] European Pat. Off. .......... 93302526

[51] Int. Cl.$^6$ .................................................. H04M 15/00
[52] U.S. Cl. .......................... 379/114; 379/112; 379/145; 379/189; 379/196
[58] Field of Search ................... 379/112–114, 116, 379/118, 120, 111, 144, 145, 182, 189, 196, 197, 201, 100.04, 115, 133, 113, 90.01, 90.02, 93.02, 93.03, 93.04; 364/286.4, 286.5

[56] References Cited

U.S. PATENT DOCUMENTS

| | | | |
|---|---|---|---|
| 4,893,330 | 1/1990 | Franco | 379/91 |
| 5,109,408 | 4/1992 | Greenspan et al. | 379/197 |
| 5,131,027 | 7/1992 | Hird et al. | 379/112 |
| 5,311,594 | 5/1994 | Penzias | 380/23 |
| 5,335,265 | 8/1994 | Cooper et al. | 379/62 |
| 5,345,595 | 9/1994 | Johnson et al. | 455/33.1 |
| 5,357,564 | 10/1994 | Gupta et al. | 379/188 |
| 5,495,521 | 2/1996 | Rangachar | 379/95 |
| 5,566,234 | 10/1996 | Reed et al. | 379/101 |
| 5,615,408 | 3/1997 | Johnson et al. | 379/33.1 |
| 5,627,886 | 5/1997 | Bowman | 379/111 |
| 5,638,430 | 6/1997 | Hogan et al. | 379/112 |

FOREIGN PATENT DOCUMENTS

A 0212654  3/1987  European Pat. Off. .
A 0583135  2/1994  European Pat. Off. .

OTHER PUBLICATIONS

Benyacar et al. "Concepts in Recording of Services", TENCON '89 — Fourth IEEE Region 10 International Conference, 22 Nov. 1989, Bombay, India, pp. 593–599 XP203943.

Obuchowski, "Access Charge and Revenue Architecture", AT&T Technical Journal, vol. 66, No. 3, May 1987, Short Hills, NJ, pp. 73–81.

Primary Examiner—Curtis Kuntz
Assistant Examiner—Binh K. Tieu
Attorney, Agent, or Firm—Nixon & Vanderhye P.C.

[57] ABSTRACT

A fraud detection system is used with a communications network, the network including a billing system having a database of customer account information and of account-associated call logging information including called numbers. Each customer account includes customer name and address information and a settable indicator which when set indicates that the account is a debt account having a predetermined debt status. The fraud detection system is responsive to a debt account accessing, in use, the database for selecting a customer account, for obtaining a group of called numbers associated with the debt account and a group of called numbers associated with the selected customer account are compared. The respectively obtained groups and, if the degree of similarity of the calling characteristics of the two customer accounts meets a predetermined criterion, an indication that the selected customer account is a probable fraudulent-application account is provided.

22 Claims, 3 Drawing Sheets

5,754,632

MANAGEMENT OF COMMUNICATIONS NETWORKS

BACKGROUND OF THE INVENTION

1. Field of the Invention

This invention relates to debt management in a communications network and particularly, but not exclusively, to the detection of customer accounts obtained by fraud.

2. Related Art

In a modern communications network such as the United Kingdom public switched telephone network (PSTN), the billing system is a sophisticated set of functions including Debt Management, which is a process to progress the collection of overdue payments including the issue of standard letters. Such a billing system is described in more detail in the article at pages 273 to 278 of British Telecommunications Engineering, Volume 11, Part 4, January 1993.

The concern of the present invention lies principally in combatting fraudulent applications for telecommunications services, which will usually be telephone service.

It should be noted that EP-A-0212654 discloses a toll telecommunications network in which a call originated by a calling customer is barred when the billing number involved with the call has a predetermined billing status such as delinquent payment. The toll network includes a list of all the billing numbers having this status. Furthermore EP-A-0583135, published on 16th February 1994, discloses a virtual communications network which includes a so-called "screening filter" for each set of call-originating locations. This filter allows or denies calls on an individual basis from the corresponding set of originating locations to each set of call destinations in dependence on the previous history of calls from the corresponding set of originating locations.

SUMMARY OF THE INVENTION

According to a first aspect of the present invention there is provided a system for determining whether a user associated with a first customer account in a communications network is probably making calls on a further customer account in the network, the network including a billing system comprising a database of customer account information and of account-associated call logging information including called numbers, each customer account comprising customer name and address information, the system comprising processing means for accessing, in use, the database for selecting the further customer account, for obtaining a group of called numbers associated with the first account and a group of called numbers associated with the selected further account, for comparing the respective obtained groups and, if the degree of similarity of the calling characteristics of the two customer accounts meets a predetermined criterion, providing an indication that the user is probably making calls on the selected further customer account.

The predetermined criterion may comprise a requirement that a called number having a predetermined number of occurrences in one of the compared groups of called numbers also has the same number of occurrences in the other compared group.

Alternatively or in addition it may comprise a requirement that a set of different called numbers occurring in one of the compared groups of called numbers also occurs in the other compared group.

The system may be for use for detecting fraud in a communications network in which each customer account further comprises a settable indicator which when set indicates that the account is a debt account having a predetermined debt status. In such a case the processing means may be arranged to operate in response to the first customer account being a debt account, the indication, if provided, being that the selected further customer account is a probable fraudulent-application account.

In such a system the processing means may, in use, select further customer accounts sequentially from the database and thereby perform such comparisons in respect of the first account and each of the further customer accounts in turn. As an alternative the processing means may include means for including the first account in a list of debt accounts and means for performing, in use, comparisons in respect of the selected further customer account and each of the debt accounts in said list, in turn. As another alternative the processing means may be arranged to select as the further customer account a matched customer account whose address matches that of the first customer account, and the processing means may include means for including the first account in a list of debt accounts. In such a case the processing means may include means for including the matched customer account in a list of matched customer accounts corresponding to the list of debt accounts, and means for comparing, in turn, the respective groups of called numbers associated with the matched customer accounts in the list with the respective groups of called numbers associated with the debt accounts corresponding to the matched customer accounts.

If the system is for use for detecting fraud in a communications network, as set forth above, the processing means may be arranged to select a customer account which is not a debt account as the or each further account. Alternatively or in addition the system may include means responsive to an indication of a probable fraudulent-application account for generating for postal despatch a standard letter in accordance with the name and address information of the probable fraudulent-application account.

Furthermore, such a system may be for use in a communications network in which each customer account further comprises a second settable indicator to indicate that the account is a probable fraudulent-application account, and a third settable indicator to indicate that the account is temporarily out of service. In such a case the processing means may be arranged, upon providing said indication, also to set the second indicator of the probable fraudulent-application account, and the system may further include means responsive to receipt of said indication and to the expiry of a predetermined time interval therefrom to set the third indicator if at said expiry the second indicator is still set.

According to a second aspect of the present invention there is provided a method of determining whether a user associated with a first customer account in a communications network is probably making calls on a further customer account in the network, the network including a billing system comprising a database of customer account information and of account-associated call logging information including called numbers, each customer account comprising customer name and address information, the method comprising the steps of accessing the database to select the further customer account, obtaining a group of called numbers associated with the first account and a group of called numbers associated with the selected further account, comparing the respective obtained groups and, if the degree of similarity of the calling characteristics of the two customer accounts meets a predetermined criterion, providing an indication that the user is probably making calls on the selected further customer account.

BRIEF DESCRIPTION OF THE DRAWINGS

Embodiments of the present invention will now be described by way of example with reference to the drawings in which.

DETAILED DESCRIPTION OF EXEMPLARY EMBODIMENTS

Figure 1:
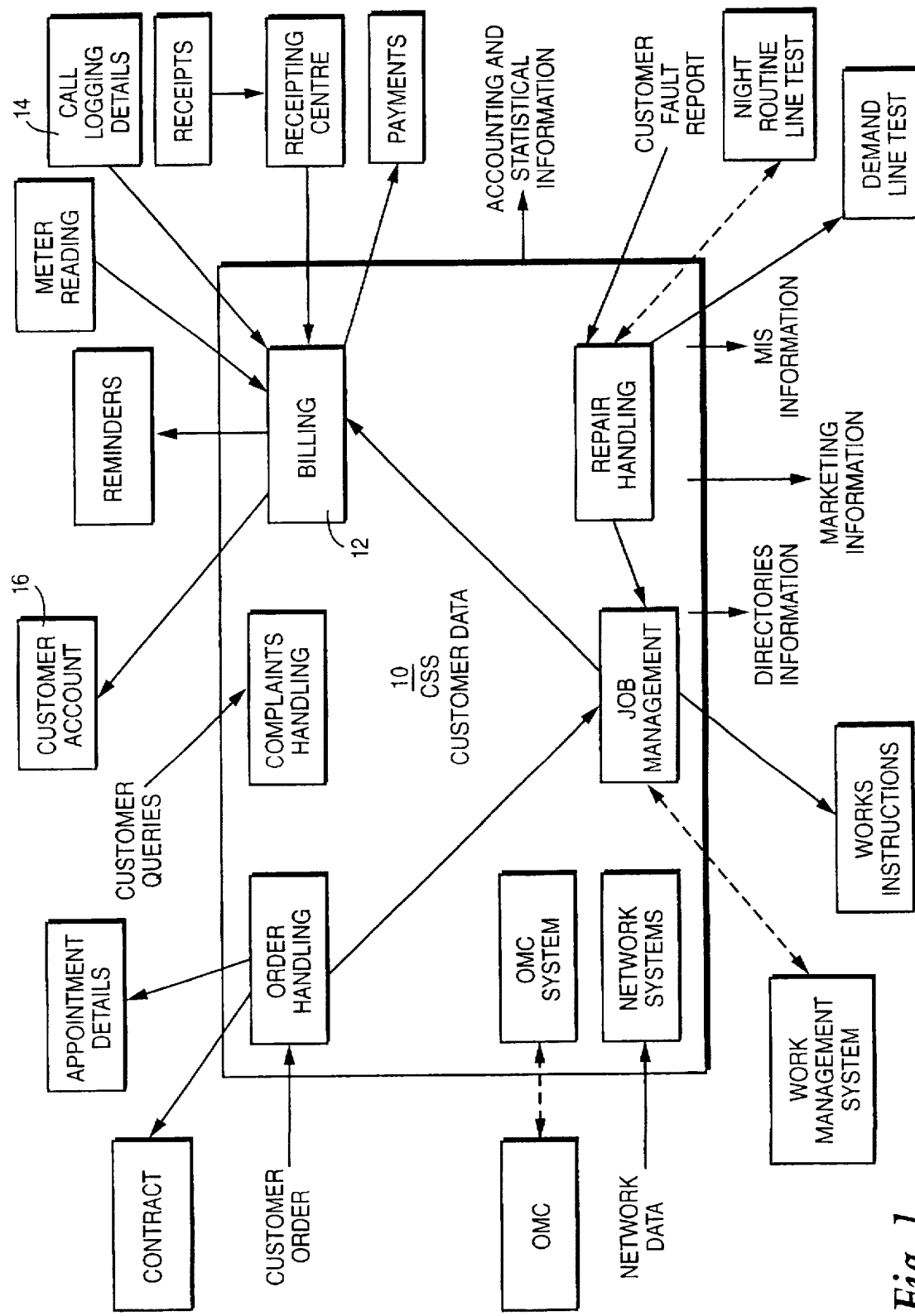
FIG. 1 is a block schematic diagram of a known customer services system for a communications network.

As can be seen in FIG. 1, a billing system is just one of a number of components of an overall customer services system (CSS) 10 forming part of the UK's public switched telephone network (PSTN). The CSS comprises over 50 individual components covering a complete range of customer-facing activities. The most important of these components and their interrelationship is shown in FIG. 1, but for the purpose of the present invention, only the billing system 12 will be described further.

A stored program controlled (SPC) exchange (not shown) forming part of the PSTN responds to a customer making a call to send to a call logging store 14 the details of the call, namely, the calling number, the called number, the date, the start time of the call and the finish time of the call.

The billing system 12 processes this information to work out the duration of the call, the distance to the called number, and the charge band appropriate to the time of day and produce a call charge. The charge details are then stored in a customer account store 16 against the calling number and when the customer's telephone bill is prepared, the set of call details and charges stored against that calling number is retrieved to be printed and sent to the customer in accordance with the name and address entered in the customer account store against the calling number.

Figure 2:
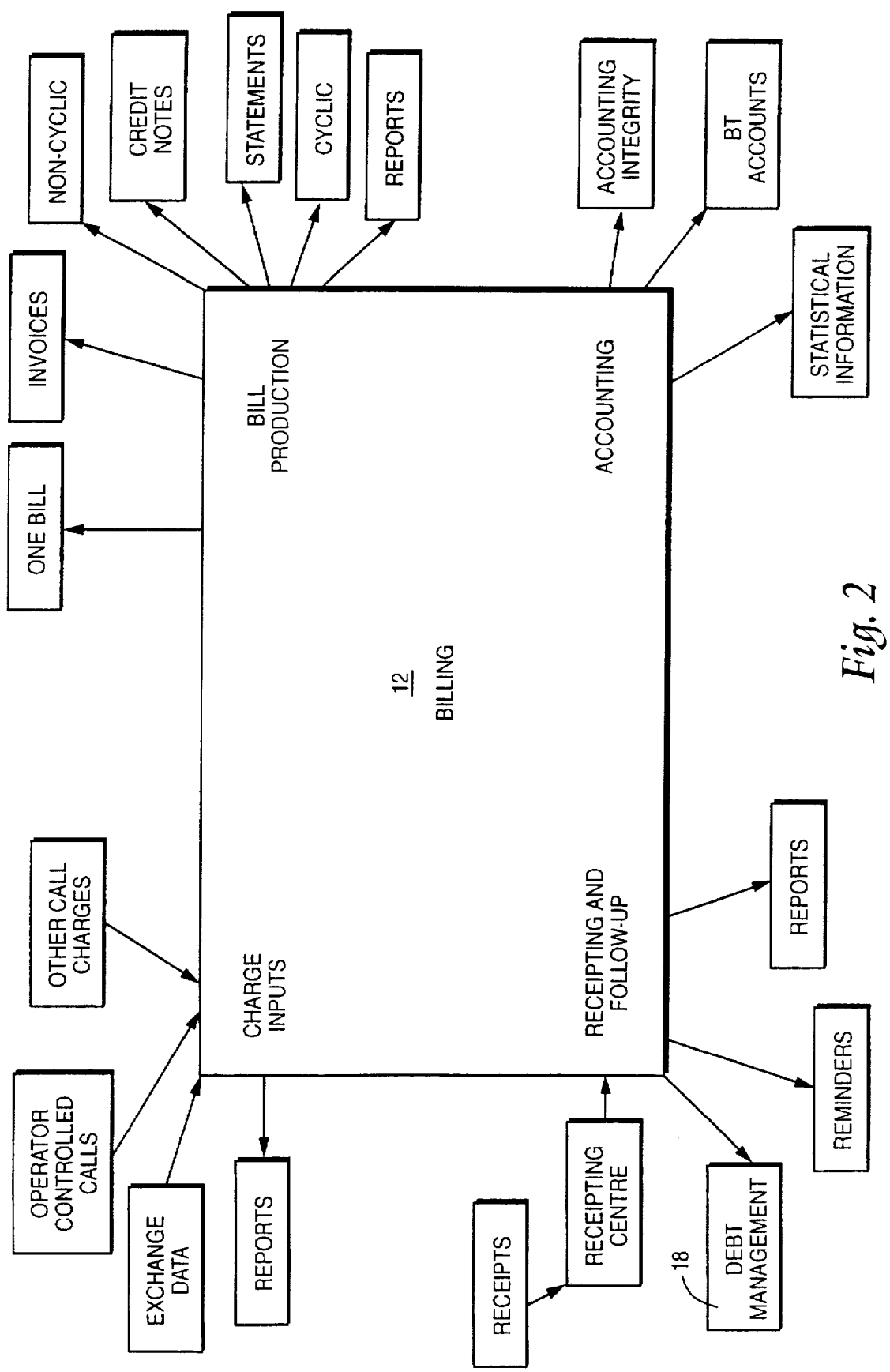
FIG. 2 is a block schematic diagram of a known billing system forming part of the customer services system of FIG. 1.

Under a debt management component or sub-system 18 of the billing system 12, shown in FIG. 2, a customer is sent a first reminder several weeks after the despatch of a statement of account. After several more weeks a second reminder is sent, and it could well be the end of the following accounting period before any positive action is taken by the network operator (accounts personnel) in respect of overdue payment. For further details of the billing system 12 and the CSS 10, the reader may wish to refer to the above mentioned article in British Telecommunications Engineering.

Under the known CSS 10 and billing system 12 as shown in FIGS. 1 and 2, the debt management sub-system 18 can be processing an overdue payment of a bill for a considerable number of weeks before a decision is taken by the network operator to recover the debt. In the meantime the customer could dishonestly apply for telephone service (declaring that he has no outstanding debt with the network operator). The dishonest customer might apply in a different name at the same address, and if he did so at the end of the accounting period for which the bill is outstanding then the amount of call charges on the new account the subject of a fraudulent application could be very large indeed by the time the fraud was detected. Such a fraud not only deprives the network operator of revenue but can also incur charges in the case of international calls made on the fraudulent-application account.

The dishonest customer who could be an individual or a company, may deliberately change address to avoid detection as well as changing name.

The present invention relates to determining that one customer is the same person as another customer on the basis of the similarity of their calling characteristics. This is princpally of use to communications network operators so as to identify at an early stage if a new customer account has been obtained by fraudulent application and that it is therefore likely that the bill on that account will not be paid.

A fraud detection system of the present invention can identify a probable fraud customer even though at a different address and using a different name from that of an existing debt account. The same principle could be used to locate a person for purposes other than fraud limitation on the basis of a known calling characteristic of that person.

In one embodiment, (FIGS. 2 and 3) the debt management sub-system 18 of the billing system 12 sets a settable indicator, or flag, in the customer account automatically upon the expiry of twenty one days from the despatch of the customer's bill if payment has not been received by that time. The account is now referred to as a debt account and a process initiated for despatch of reminder letters of increasing severity. Thus, as used herein, the term "debt account" means an account which has a predetermined debt status indicated by its flag being set.

When payment is received on a debt account, accounts personnel will normally reset the debt indicator. Further indicators are also used to indicate various stages of debt management as mentioned later.

Figure 3:
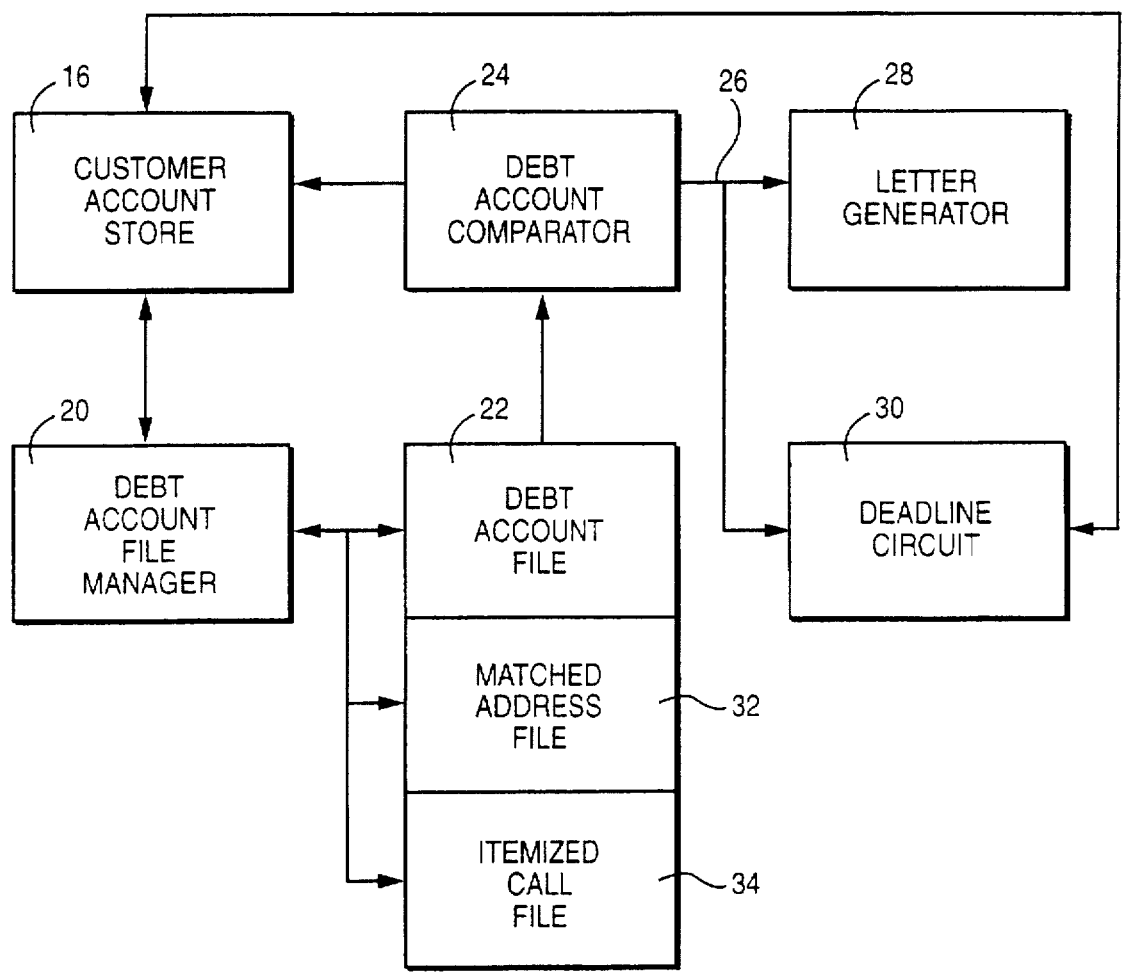
FIG. 3 is a block schematic diagram of a fraud detection system of the present invention associated with the billing system of FIG. 2.

In FIG. 3, a debt account file manager 20 accesses each of the accounts in the customer account store 16 in turn, and if an account has a set indicator, the manager 20 adds certain account details to a file (or list) called a debt account file 22. These details will be sufficent to identify the account and to enable the installation address to be matched with the installation address of a new customer account at the same address. For an individual person, the installation address will probably be the customer address, but this will not necessarily be the case for a company having several instruments which are not at the same physical address.

The file manager 20 takes about 3 hours to access approximately 2 million customer accounts held in a regional billing system. Once the file manager 20 has been run initially and file 22 has been created it is only necessary to check a list of amendments made to the customer accounts to top-up the file. This topping-up is done daily.

It will be appreciated that not only are new debt accounts added to the file 22 but also old debt accounts which have had their indicator reset will be deleted from the file.

The file manager 20 accesses file 22 and in response to the debt accounts therein retrieves the itemised call details for the ultimate and penultimate bills from the call logging store 14 and writes these into an itemised call file 34. The daily topping-up performed by the file manager 20 keeps the itemised call file 34 up to date.

The file manager 20 accesses the debt account file 22 and obtains the installation address details of the first entry in the file. From these the file manager 20 accesses the customer account store 16 and looks for an account having the same installation address. Such an account is referred to herein as a possible fraudulent-application account (POSS, for convenience). The file manager 20 writes the corresponding address details into a matched address file 32.

When the file manager 20 has checked all accounts in the customer account store 16, a debt account comparator 24 now accesses the matched account file 32 and for each POSS in turn accesses the itemised all file 34 for the debt account and the customer account store 16 for the POSS to retrieve the respective called number information from the itemised accounts for the last two accounting periods of the debt account, and for the last four weeks of the POSS. Ideally, the comparator will be operative daily so as to identify probable fraudulent application accounts (referred to herein as PROB, for convenience) as soon as possible. The comparator 24 checks to see if the calling characteristics of the POSS are the same as those of the debt account having the same installation address in accordance with a predetermined criterion.

The comparator 24 provides an output signal (indication) 26 if both accounts have ten calls made (logged) to the same called number. If this requirement is not satisfied, the comparator 24 next checks whether there exists in each of the retrieved itemised accounts a set of the same five different called numbers, and provides the output signal 26 if this requirement is satisfied. The comparator also sets a settable indicator in the new customer account to indicate that this is a PROB. The output signal 26 is indicative that the new account is a PROB and is fed to an automatic letter generator 28 which responds by printing a letter for despatch by postal service to the customer of the PROB. Such a letter would make reference to the similarity of the PROB to the debt account and invite the customer to provide an explanation.

A deadline circuit 30 is responsive to the date of issue of the letter despatched by the automatic letter generator 28 and checks to see whether a predetermined deadline, for example 21 days from this date of issue, has expired without the network operator having reset the indicator which indicates that the account was a PROB. In this event, the deadline circuit 30 will be operative to set the first of a set of flags associated with the management of such an account. These flags indicate, inter alia, that a reply has been received, that a request for a deposit has been made, that a reply to that request has been received, and that the account is temporarily out of service (TOS). In the absence of receipt of a satisfactory explanation by a given date, the network operator could suspend service to the customer.

In greater detail, the debt account file manager 20 is constituted by a suite of programs, and comprises a first program which identifies all debt accounts in the-customer account store 16 by means of the associated indicator in the customer account record known as CUST-AC. For each debt account found an entry is made in the debt account file 22 comprising certain elements of the installation address to be used to match with a new customer at the same address.

The suite also comprises a second program which uses the debt account file 22 to find those addresses in the customer account store 16 which have current service, and store them in a matched address file 32. The addresses of current and debt accounts are matched using certain elements of the address (e.g. postcode, thoroughfare ID, premises and subpremises number).

The suite also comprises a third program which creates a file 34 of all itemised calls on the last two bills of the debt accounts. This file will be used for comparison against the call logging information of the current customer at that address.

The above three programs are associated with a fourth, "top-up" program which is run daily on the daily amendments made to the database and thereby makes corresponding amendments to the debt account file 22, the matched address file 32, and the itemised call file 34.

The suite also comprises a fifth program which checks all accounts stored in the matched address file 32 against the call logging store 14 to identify those current account holders at debt account addresses which have made calls in the last week; and a sixth program responsive to the output of the fifth program to get all calls made in the last four weeks by the identified current account holders.

The debt account comparator 24 comprises a program which compares the output of the third and sixth programs to identify numbers called by the debt account and the current account at the same address, and also a program which identifies those customers who have a common call pattern (or characteristic) which is either ten or more calls to the same number, or calls made to five or more different numbers by the two customers.

If desired, the fifth program need not be used, and the sixth program can operate for all current account holders in the matched address file 32.

In the embodiment of FIG. 3, the debt account comparator 24 compares installation address details of the first entry in the file 22 with all the entries in the customer account store 16, except those already having a set debt account indicator, and then proceeds to repeat the process for the next entry in the file 22, and so on. In an alternative, not shown, the comparator 24 compares the first entry of the customer account store 16 with all the entries in the file 22 and then repeats the process for the next entry in the customer account store 16, and so on.

The embodiments described above are based an the concept of a fraudulent application for telephone services being made by the bad debt customer in a different name but at the same address. An alternative embodiment is based other concept that a bad debt customer has moved to a new address and applies for telephone service in a different name.

In this latter embodiment, a debt account file manager 20 creates a debt account file 22, and an itemised call file 34 as in the above embodiments, and a debt account comparator 24 checks the calling characteristics of a debt account with those of each of the customer accounts, except those already identified as debt accounts.

As before, this embodiment checks all the customer accounts against the first debt account, and then against the second, and so on, and in an alternative embodiment, not shown, the first customer account is checked against each debt account, then the second customer account is so checked, and so on.

It will be appreciated that the above mentioned comparison processes will ignore for characteristic matching purposes certain called numbers, for example, 123 (speaking clock), for which there could be a legitimate reason why both accounts contain these called numbers.

Whereas in the above described embodiments, the called number information for a debt account is retrieved from the customer account store 16 by the file manager 20 and stored in the itemised call file 34, it will be appreciated that the comparator 24 may be responsive to a debt account to retrieve such itemised call information directly from the customer account store 16.

Furthermore, whereas the comparator 24 does two comparisons in sequence, it will be appreciated that the calling characteristics can be compared on the basis of the first comparison only, or of the second comparison only. Furthermore, a PROB could the indicated only if both comparisons give a positive result.

The abovementioned UK PSTN comprises an interconnected network of SPC exchanges. This is nor essential to the present invention which may be embodied in other forms of communications network, for example, a network based on passive optical network technology.

The customer account details, for example, name, address, and various flags concerned with account management may be held in a store which is physically separate from that for holding the call logging details. Alternatively all the information may be in one large store. The particular arrangement of storing and accessing the information is not important, and the collective stores of such billing account information is referred to herein as a database of customer account information and of account-associated call logging information. Such as database may be a regional database, or one for the whole network, and may be cent-ally located in the region or national network, or distributed.

I claim:

1. A system for determining whether a user associated with a first customer account in a communications network is probably making calls on a further customer account in the network, the system including:

a data base of customer account information and of account-associated call logging information including called numbers, each customer account comprising customer name and address information, and processing means for (a) accessing the database for selecting the further customer account, (k) for obtaining a group of called numbers associated with the first account and a group of called numbers associated with the selected further account, (c) for comparing the respective obtained groups and, if the degree of similarity of the calling characteristics of the two customer accounts meets a predetermined criterion, (d) for providing an indication that the user is probably making calls on the selected further customer account.

2. A system as in claim 1, wherein the predetermined criterion comprises a requirement that a called number having at least a predetermined number of occurrences in one of the compared groups of called numbers also has at least the same number of occurrences in the other compared group.

3. A system as in claim 1, wherein the predetermined criterion comprises a requirement that a set of different called numbers occurring in one of the compared groups of called numbers also occurs in the other compared group.

4. A system as in claim 1, for detecting fraud in a communications network in which each customer account further comprises a a settable indicator which when set indicates that the account is a debt account having a predetermined debt status, the processing means being arranged to operate in response to the first customer account being a debt account, the indication, if provided, being that the selected further customer account is a probable fraudulent-application account.

5. A system as in claim 4, wherein the processing means selects further customer accounts sequentially from the database and thereby performs comparisons in respect of the first account and each of the further customer accounts in turn.

6. A system as in claim 4, wherein the processing means includes:

means for including the first account in a list of debt accounts and means for performing comparisons in respect of the selected further customer account and each of the debt accounts in said list in turn.

7. A system as in claim 4, wherein:

the processing means is arranged to select as the further customer account, a matched customer account whose address matches that of the first customer account, and the processing means includes means for including the first account in a list of debt accounts.

8. A system as in claim 7, wherein the processing means includes means for including the matched customer account in a list of matched customer accounts corresponding to the list of debt accounts, and means for comparing, in turn, the respective groups of called numbers associated with the matched customer accounts in the list with the respective groups of called numbers associated with the debt accounts corresponding to the matched customer accounts.

9. A system as in claim 4, wherein the processing means is arranged to select a customer account which is not a debt account as each further account.

10. A system as in claim 4 further including means responsive to an indication of a probable fraudulent-application account for generating for postal despatch a standard letter in accordance with the name and address information of the probable fraudulent-application account.

11. A system as in claim 4, for use in a communications network in which each customer account further comprises a second settable indicator to indicate that the account is a probable fraudulent-application account, and a third settable indicator to indicate that the account is temporarily out of service, in which system the processing means is arranged, upon providing said indication, also to set the second indicator of the probable fraudulent-application account, the system further including means responsive to receipt of said indication and to the expiry of a predetermined time interval therefrom to set the third indicator if at said expiry the second indicator is still set.

12. A method of determining whether a user associated with a first customer account in a communications network is probably making calls on a further customer account in the network, the network including a billing system comprising a database of customer account information and of account-associated call logging information including called numbers, each customer account comprising customer name and address information, the method comprising the steps of:

accessing the database to select the further customer account, obtaining a group of called numbers associated with the first account and a group of called numbers associated with the selected further account, comparing the respective obtained groups and, if the degree of similarity of the calling characteristics of the two customer accounts meets a predetermined criterion, providing an indication that the user is probably making calls on the selected further customer account.

13. A method as in claim 12, wherein the predetermined criterion comprises:

a requirement that a called number having at least a predetermined number of occurrences in one of the compared groups of called numbers also has at least the same number of occurrences in the other compared group.

14. A method as in claim 12, wherein:

the predetermined criterion comprises a requirement that a set of different called numbers occurring in one of the compared groups of called numbers also occurs in the other compared group.

15. A method as in claim 12, for detecting fraud in a communications network in which each customer account further comprises:

a settable indicator which when set indicates that the account is a debt account having a predetermined debt status, the first customer account being a debt account and, the indication, if provided, being that the selected further customer account is a probable fraudulent-application account.

16. A method as in claim 15, wherein:

further customer accounts are selected sequentially from the database and comparisons are performed in respect of the first account and each of the further customer accounts in turn.

17. A method as in claim 15, wherein the first account is included in a list of debt accounts and comparisons are performed in respect of the selected further customer account and each of the debt accounts in said list, in turn.

18. A method as in claim 15, wherein:

the further customer account is a matched customer account whose address matches that of the first customer account, and the first account is included in a list of debt accounts.

19. A method as in claim 18, wherein:

the matched customer account is included in a list of matched customer accounts corresponding to the list of debt accounts, and the respective groups of called numbers associated with the matched customer accounts in the list are compared, in turn, with the respective groups of called numbers associated with the debt accounts corresponding to the matched customer accounts.

20. A method as in claim 15, wherein each further account selected is a customer account which is not a debt account.

21. A method as in claim 15 further including:

responding to an indication of a probable fraudulent-application account by generating for postal despatch a standard letter in accordance with the name and address information of the probable fraudulent-application account.

22. A method as in claim 15, for detecting fraud in a communications network in which each customer account further comprises:

a second settable indicator to indicate that the account is a probable fraudulent-application account, a third settable indicator to indicate that the account is temporarily out of service, upon said indication being provided, the second indicator of the probable fraudulent-application account is also set, and responding to receipt of said indication and to the expiry of a predetermined time interval therefrom by setting the third indicator if at said expiry the second indicator is still set.

* * * * *